United States Patent [19]

Seffrood

[11] 4,236,444

[45] Dec. 2, 1980

[54] FORAGE PRESS

[76] Inventor: Leroy J. Seffrood, Rte. #1, South Wayne, Wis. 53587

[21] Appl. No.: 30,108

[22] Filed: Apr. 16, 1979

[51] Int. Cl.³ .......................... A01F 25/16; B65G 3/04
[52] U.S. Cl. ......................................... 100/65; 56/16.6
[58] Field of Search ................. 100/65; 141/10, 114, 141/313; 15/348, 349; 56/16.6

[56] References Cited

U.S. PATENT DOCUMENTS

| | | | |
|---|---|---|---|
| 870,215 | 11/1907 | Bates | 141/10 |
| 3,687,061 | 8/1972 | Eggenmuller et al. | 100/65 |
| 4,046,068 | 9/1977 | Eggenmuller et al. | 100/65 |

FOREIGN PATENT DOCUMENTS 2005218  8/1977  Fed. Rep. of Germany ............. 100/65

*Primary Examiner*—Christopher K. Moore
*Attorney, Agent, or Firm*—Isaksen, Lathrop, Esch, Hart & Clark

[57] ABSTRACT

A forage press is disclosed for use in injecting forage or other feed material into an elongated flexible horizontal forage receptacle or silo. The forage press includes an injection chamber for introducing material into the forage receptacle and a press wheel which presses the material through the injection chamber into the receptacle. The press wheel is formed in a circular shape and includes a plurality of sectors each of which is formed at a canted angle so as to press the forage material into the injection chamber as the press wheel is rotationally driven by an external source of power.

10 Claims, 4 Drawing Figures

FORAGE PRESS

BACKGROUND OF THE INVENTION

1. Field of the Invention

The present invention relates to feed storage devices in general and, in particular, to devices for introducing feed materials into elongated forage receptacles or silos designed to be positioned in a horizontal position along the ground.

2. Description of the Prior Art

The prior art is generally cognizant of the use of devices for injecting forage and silage material and similar plant material into elongated storage receptacles or other similar purpose receptacles. An example of such a device is shown in U.S. Pat. No. 3,687,061. Other devices are known in the art for use in compressing or compacting leaves or grass in bailing devices, and examples of such devices are shown in U.S. Pat. Nos. 3,222,853 and 3,229,320. Other patents which may show the general state of the art in related technologies include U.S. Pat. Nos. 2,158,745, 3,348,475, and 4,046,068.

SUMMARY OF THE INVENTION

The present invention is summarized in that a forage press for use in filling a collapsible forage receptacle includes a tapered injection chamber adapted to being inserted into the forage receptacle, a press chamber connected to the injection chamber, a feed chute connected to the press chamber so that forage may be supplied therethrough to the press chamber, a drive connection adapted to being connected to an external source of power, and a press wheel located in the press chamber and connected to the drive connection so as to be rotationally driven thereby, the press wheel being of a generally circular shape and being divided into a plurality of sectors, each of the sectors being canted at an angle so as to press the forage through the injection chamber into the forage receptacle as the press wheel is rotated.

It is an object of the present invention to provide an apparatus for efficiently introducing forage material into a collapsible forage receptacle.

It is another object of the present invention to provide such a device for use in a forage receptacle which is relatively impervious to being jammed, fouled or otherwise hindered in its operation by the material it is operating upon.

It is yet another object of the present invention to provide such a device which is efficient and rapid in its operation.

Other objects, advantages, and features of the present invention will become apparent from the following specification when taken in conjunction with the accompanying drawings.

DESCRIPTION OF THE PREFERRED EMBODIMENT

Figure 1:
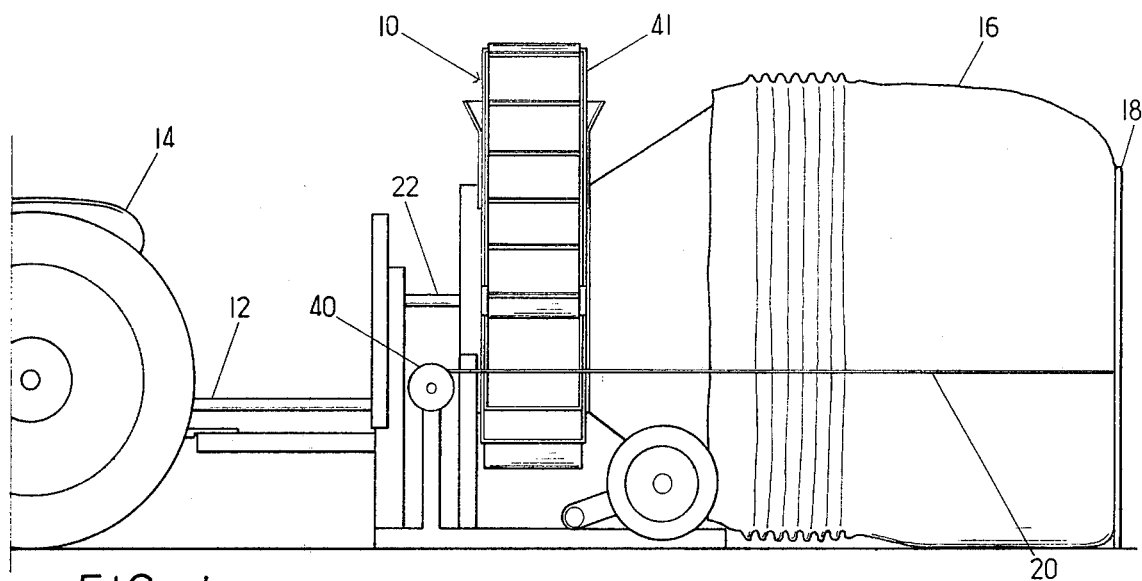
FIG. 1 is a side elevation view of a forage press constructed in accordance with the present invention shown connected to an external source of power and in use in filling a forage receptacle.

Shown in FIG. 1 is a forage press, generally indicated at 10, constructed in accordance with the present invention. Also shown in FIG. 1 in conjunction with the forage press 10 is a tractor 14 connected to the forage press 10 by a power take off attachment 12. The forage press 10 is in turn connected to the interior of a collapsible forage receptacle 16 which, in the embodiment of FIG. 1, is an elongated flexible plastic bag designed to receive forage material therein and to lie upon the ground. The forage receptacle 16 is provided at its end most distant from the forage press 10 with a gate member 18 which is connected by a pair of cables 20 on opposite sides of the forage receptacle 16 to the forage press 10.

Figure 2:
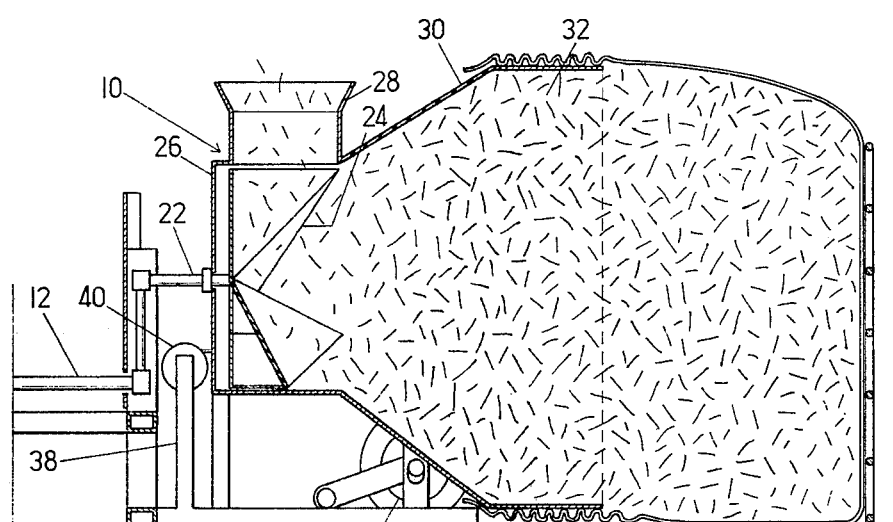
FIG. 2 is a longitudinal cross-sectional view taken through the apparatus of FIG. 1.

More details of the forage press 10 may be seen in FIG. 2, which shows a cross-sectional view taken along the longitudinal center line of the forage press 10. As can be seen in FIG. 2, the power take-off attachment 12 of the tractor connects to a drive connection 22 mounted in the forage press 10. The drive connection 22 is in turn connected to a press wheel 24 located inside of a press chamber 26 in the center of the forage press 10. The press chamber 26 is a generally cylindrical chamber sized to be just slightly greater than the diameter of the generally circular press wheel 24 so that the press wheel 24 may freely rotationally move therein without obstruction. At the top of the press chamber 26 a feed chute 28 is provided opening vertically upward from and in communication with the press chamber 28 so that forage material may be introduced through the feed chute 28 into the press chamber 26. Tapering outward in a concial fashion from the open end of the press chamber 26 is an injection chamber 30. The injection chamber 30 tapers outwardly in size from just greater than the diameter of the press wheel 24 at its junction with the press chamber 26 to a size almost as wide in diameter as at its outer end as the diameter of the forage receptacle 16. A cylindrical skirt portion 32 is formed around the periphery of the injection chamber 30 and the unfilled loose portion of the forage receptacle 16 is punched around the outside of the skirt portion 32, as is illustrated in FIG. 2. The operative parts of the forage press 10 are mounted upon a frame 34 of tubular metal or other rigid material, and the frame 34 has mounted upon it a pair of retractable wheels 36. A pair of upright support members 38 are provided behind the press chamber 26 so that a pair of winches 40 may each be mounted on a respective one of the support members 38. The winches 40 receive thereon the cables 20 which are attached at their other ends to the gate member 18. A feed conveyor 41 is provided, as can be seen in FIG. 1, slanting upward from ground level toward the feed chute 28 so that forage material may be carried by the feed conveyor 41 from a level suitable for human loading up into the top of the feed chute 28.

Figure 3:
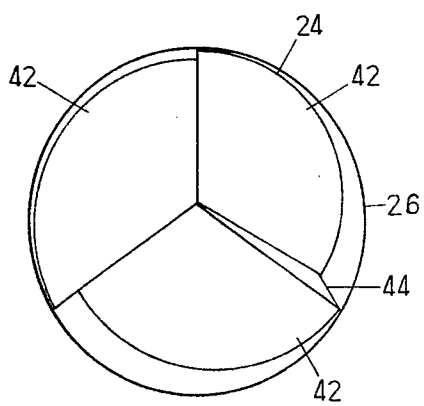
FIG. 3 is a front perspective view of the press wheel within the press chamber of the forage press of FIG. 1 when viewed from its open end.

Shown in FIG. 3 is a view of the front face of the press wheel 24 as received in the press chamber 26 and as would be viewed from the direction of the injection chamber 30. As can be seen in FIG. 3, the press wheel 24 is divided into three pressing surfaces or sectors 42. Each of the three sectors 42 forms an equal portion of the circular area defined by the press wheel 24 and each of the sectors 24 is of a shape as formed by two radii of the circle formed by the press wheel 24 and the arc of that circle that extends therebetween. Each of the sectors 42 is canted at an oblique angle relative to the axis of rotation of the press wheel 24, with the cant of the three sectors 42 being all in the same direction. Each of the sectors 42 defines a continuous surface extending from a leading radially extending edge to a trailing radially extending edge which projects forwardly of the leading edge of the next adjacent sector 42 and which is connected to that next leading edge by a radially extending ledge 44. The portion of the surface of each sector 42 adjacent to the leading edge thereof together with the adjacent ledge 44 defines a charging cavity to receive forage material supplied to the press chamber 26 from the feed chute 28. The press wheel 24 as shown in FIG. 3 is designed to be operated by being rotationally driven in a clockwise direction, although it is envisioned that such a press wheel 24 may be provided to operate in an opposite direction providing the cant of the sectors 42 of the press wheel 24 is reversed. It is also envisioned that the number of sectors 42 in the press wheel 24 may be varyed over a wide range while still allowing the press wheel 24 to operate in an efficient and satisfactory manner.

In the operation of the entire forage press 10 of FIGS. 1-3, the gate member 18 is first secured to the forage receptacle 16 and the injection chamber 30 with its associated skirt 32 is inserted into the open end of the forage receptacle 16. Then the cables 20 are secured between the gate member 18 and the pair of winches 40. After this is done, the forage press 10 may be connected to the power take-off 12 of the tractor 14 so that the power from the power take-off 12 is transmitted by the drive connection 22 to rotate the press wheel 24. Suitable mechanism is also provided, although not shown, to connect the feed conveyor 41 to the power drive from the tractor, so that the feed conveyor 41 is simultaneously operated with the press wheel 24. The operation of the feed conveyor 41 allows forage material to be placed upon the feed conveyor 41 at which time it is transmitted upward and dumped into the feed chute 28. Forage material dumped into the feed chute 28 travels downward into the press chamber 26 where it contacts the rotating press wheel 24. The canted character of the sectors 42 of the press wheel 24 combined with the rotation of the press wheel 24 causes the forage material received in the press chamber 26 to be cammed outward away from the press wheel 24. As additional forage material is supplied through the conveyor 41 to the chute 24 and is pressed by the press wheel 24, the material is compacted into the injection chamber 30. This material gradually fills the portion of the forage receptacle 16 in front of the forage press 10 until the portion of the receptacle 16 between the forage press 10 and the gate member 18 is filled with forage material. Thereafter, additional compacting of the material within the injection chamber 30 in the interior of the forage receptacle 16 causes the forage press 10 to be gradually pushed away from the gate member 18 by the action of the press wheel 24 as transmitted through the forage material within the forage receptacle 16. The relative compactness of the material within the forage receptacle 16 can be varied merely by adjusting the pressure on the winches 40 which act as cable brakes upon the action of the forage press 10 as it moves. Thus, by applying additional braking pressure on the winches 38, the pressure necessary to move the forage press 10 is increased, and the forage material within the forage receptacle 16 must be additionally compacted in order to move the forage press 10. In this manner, the forage receptacle 16 is slowly filled to capacity by the forage press 10.

Figure 4:
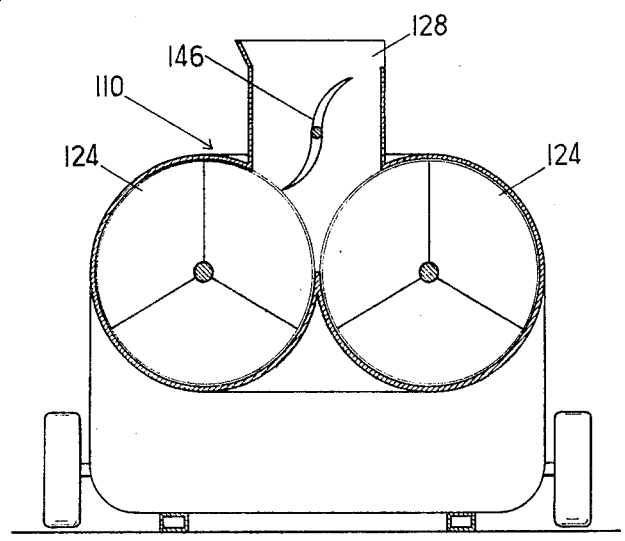
FIG. 4 is a cross-sectional view of an alternative embodiment of a forage press constructed in accordance with the present invention.

Illustrated in FIG. 4 is an alternative embodiment of a forage press constructed in accordance with the present invention, and generally indicated at 110. The forage press 110, here shown in a generally schematic fashion, includes a pair of press wheels 124, located in side by side relation. A single feed chute 128 is provided to feed both of the press wheels 124, and a rotating feed director 146 is provided in the feed chute 128 to distribute the incoming forage material between the two press wheels 124. The forage press 110 operates in a manner similar to the forage press 10 of FIGS. 1-3, except that the forage press 110 has twice the compacting capacity of the forage press 10 of FIGS. 1-3 because of the two press wheels 124. It is envisioned that as many additional press wheels as are desired for the particular forage press may be utilized, and that the number of sectors in each of the press wheels may be varied as desired.

The forage press constructed in accordance with the present invention is suitable for use with all manner of stored animal feeds including forage, silage, haylage and similar materials. The forage press functions with the press wheel to insert the feed material with a preselected compactness and with little possibility of any jamming or fouling of the press wheel 24, since an unbroken solid surface is presented to the feed material.

It is to be understood that the present invention is not limited to the particular construction and arrangement of parts disclosed and illustrated herein, but embraces all such modified forms thereof as come within the scope of the following claims.

I claim:

1. A forage press for use in filling a collapsible forage receptacle comprising:
   a tapered injection chamber adapted to be inserted into the forage receptacle;
   a press chamber connected to the injection chamber;
   a feed chute connected to the press chamber so that forage may be supplied therethrough to the press chamber;
   a drive connection adapted to be connected to an external source of power; and
   a press wheel located in the press chamber and connected to the drive connection so as to be driven thereby to rotate about an axis, the press wheel being of a generally circular shape and being divided into a plurality of sectors, each of the sectors being canted at an oblique angle relative to the rotational axis and to the plane of rotation of the press wheel so as to press forage through the injection chamber into the forage receptacle as the press wheel is rotated.

2. A forage press as claimed in claim 1 wherein the press wheel is divided into three sectors.

3. A forage press as claimed in claim 1 wherein there are two of the press wheels in the press chamber.

4. A forage press as claimed in claim 3 wherein a feed director is positioned in the feed chute to direct forage alternatively to each of the two press wheels.

5. A forage press as claimed in claim 1 wherein each of the sectors in the press wheel includes a leading edge and a trailing edge with the leading edge located rearwardly of the trailing edge and wherein each trailing edge terminates in a ledge extending to the leading edge of the next adjacent sector.

6. A forage press as claimed in claim 1 further including a feed conveyor to carry forage to the feed chute.

7. A forage press as claimed in claim 1 further including a gate for use with the forage press located at the opposite end of the forage receptacle and further including a pair of winches on the forage press adapted to be connected to cables secured to the gate at the end of the forage receptacle so that the winches can act as cable brakes on movement of the forage press as the pressing of the forage into the forage receptacle causes the forage press to be moved away from the gate.

8. A forage press for use in filling a collapsible forage receptacle comprising:
   a tapered injection chamber adapted to be inserted into the forage receptacle;
   a press chamber connected to the injection chamber;
   a feed chute connected to the press chamber so that forage may be supplied therethrough to the press chamber;
   a drive connection adapted to be connected to an external source of power; and
   a press wheel located in the press chamber and connected to the drive connection so as to be driven thereby to rotate about an axis, the press wheel having a front face directed forwardly toward the injection chamber and provided with a plurality of discrete pressing surfaces, each of the pressing surfaces extending at an oblique angle to the axis of the wheel and having a leading edge and a trailing edge projecting forwardly of the leading edge whereby the surface will progressively press supplied forage forwardly through the injection chamber as the press wheel is rotated.

9. A forage press for use in filling a collapsible forage receptacle comprising:
   a tapered injection chamber adapted to be inserted into the forage receptacle;
   a press chamber connected to the injection chamber;
   a feed chute connected to the press chamber so that forage may be supplied therethrough to the press chamber;
   a drive connection adapted to be connected to an external source of power; and
   a press wheel located in the press chamber and connected to the drive connection so as to be driven thereby to rotate about an axis, the press wheel being of generally circular peripheral shape and having a front face directed forwardly toward the injection chamber and divided into a plurality of sectors, each of the sectors extending as a continuous surface from a leading radially extending edge to a trailing radially extending edge, each trailing edge projecting forwardly as it extends radially from the center to the periphery of the press wheel such that the surface of each sector is canted at a forwardly projecting oblique angle to progressively press forage supplied to the press chamber in front of the press wheel through the injection chamber and into the forage receptacle as the press wheel is rotated.

10. A forage press as claimed in claim 9 wherein a radial ledge extends from the forwardly extending trailing edge of each sector to the rearwardly positioned leading edge of the next adjacent sector, the radial ledge being defined at its outer periphery by an outer edge extending in close proximity to the press chamber wall during rotation of the press wheel, the radial ledge and the portion of the sector surface adjacent to the sector leading edge defining a charging cavity in front of the press wheel for receiving forage supplied to the press chamber to be progressively pressed through the injection chamber by the surface of the sector during rotation of the press wheel.

* * * * *